United States Patent
Dai et al.

(10) Patent No.: US 12,445,521 B2
(45) Date of Patent: *Oct. 14, 2025

(54) LOAD BALANCING USING MULTIPLE ACTIVE SESSION ZONES

(71) Applicant: Zoom Communications, Inc., San Jose, CA (US)

(72) Inventors: Yongxiang Dai, Hefei (CN); Yong Yang, San Jose, CA (US); Hongjian Zhao, Campbell, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,044

(22) Filed: Jul. 6, 2023

(65) Prior Publication Data

US 2023/0353632 A1    Nov. 2, 2023

Related U.S. Application Data

(63) Continuation of application No. 17/345,956, filed on Jun. 11, 2021, now Pat. No. 11,785,077, which is a
(Continued)

(51) Int. Cl.
| | |
|---|---|
| H04L 12/24 | (2006.01) |
| H04L 41/0803 | (2022.01) |
| H04L 65/1046 | (2022.01) |
| H04L 65/1066 | (2022.01) |
| H04L 65/80 | (2022.01) |
| H04L 67/1029 | (2022.01) |
| H04L 67/1034 | (2022.01) |

(52) U.S. Cl.
CPC ...... *H04L 67/1034* (2013.01); *H04L 65/1046* (2013.01); *H04L 65/1066* (2013.01); *H04L 65/80* (2013.01); *H04L 67/1029* (2013.01)

(58) Field of Classification Search
CPC ............. H04L 67/1034; H04L 65/1046; H04L 65/1066; H04L 65/80; H04L 67/1029; H04L 67/02; H04L 65/403; H04L 67/1004; H04L 67/142; H04L 67/145; H04L 67/148; H04L 67/568; H04L 65/1104
USPC ........................................................ 709/219
See application file for complete search history.

(56) References Cited

U.S. PATENT DOCUMENTS

| | | |
|---|---|---|
| 6,763,356 B2 | 7/2004 | Borchers |
| 6,804,703 B1 | 10/2004 | Allen et al. |

(Continued)

FOREIGN PATENT DOCUMENTS

| | | |
|---|---|---|
| KR | 20150124642 A | 11/2015 |
| WO | 2008014639 A1 | 2/2008 |

*Primary Examiner* — Ario Etienne
*Assistant Examiner* — Elizabeth Kassa
(74) *Attorney, Agent, or Firm* — Young Basile Hanlon & MacFarlane, P.C.

(57) ABSTRACT

Load balancing is maintained for communication sessions using session initiation protocol (SIP) processes between multiple active session zones in a first datacenter and a standby session zone in a second datacenter. In the event of a failure at a first active session zone at the first datacenter, a failover to the second active session zone at the first datacenter is performed such that there are no interruptions in the active sessions. In the event of a failure at both active session zones at the first datacenter, a failover to the second datacenter is performed.

20 Claims, 9 Drawing Sheets

Related U.S. Application Data continuation of application No. PCT/CN2021/091145, filed on Apr. 29, 2021.

(56) References Cited

U.S. PATENT DOCUMENTS

| | | | |
|---|---|---|---|
| 7,818,408 B1 | 10/2010 | Ignatuk et al. | |
| 7,861,247 B1* | 12/2010 | Santos | G06Q 10/06 700/99 |
| 8,046,446 B1 | 10/2011 | Karr et al. | |
| 8,065,559 B2 | 11/2011 | Kamath et al. | |
| 8,145,768 B1* | 3/2012 | Hawthorne | H04L 63/166 709/227 |
| 8,156,504 B2 | 4/2012 | Sukirya | |
| 8,335,943 B2 | 12/2012 | Kamath et al. | |
| 8,438,254 B2 | 5/2013 | Hopen et al. | |
| 8,549,146 B2 | 10/2013 | Stanisic et al. | |
| 8,588,642 B2 | 11/2013 | Mori et al. | |
| 8,595,546 B2 | 11/2013 | Dalton | |
| 8,661,287 B2 | 2/2014 | Spear | |
| 8,676,979 B2 | 3/2014 | Fell et al. | |
| 8,775,628 B2 | 7/2014 | Francis et al. | |
| 9,189,316 B2 | 11/2015 | Butterworth | |
| 9,251,232 B2 | 2/2016 | Carvalho | |
| 9,274,906 B2 | 3/2016 | Calder et al. | |
| 9,286,171 B2 | 3/2016 | Cardona et al. | |
| 9,459,925 B2 | 10/2016 | Lawson et al. | |
| 9,774,537 B2 | 9/2017 | Jain et al. | |
| 9,916,113 B2 | 3/2018 | Zohar et al. | |
| 10,063,479 B2 | 8/2018 | Kim et al. | |
| 10,735,250 B2* | 8/2020 | Liu | H04L 67/1034 |
| 10,788,995 B2 | 9/2020 | Nguyen | |
| 11,165,789 B1 | 11/2021 | Smith | |
| 11,429,353 B1 | 8/2022 | Liguori et al. | |
| 11,449,394 B2 | 9/2022 | Bedadala et al. | |
| 11,483,427 B1* | 10/2022 | Anderson | H04L 65/403 |
| 11,539,757 B1* | 12/2022 | Evans | H04L 65/1016 |
| 11,575,741 B2 | 2/2023 | Yang et al. | |
| 11,640,340 B2 | 5/2023 | Sontakke et al. | |
| 2002/0147704 A1 | 10/2002 | Borchers | |
| 2003/0005350 A1 | 1/2003 | Koning et al. | |
| 2003/0016624 A1* | 1/2003 | Bare | H04L 67/1001 370/252 |
| 2005/0108593 A1 | 5/2005 | Purushothaman | |
| 2005/0132030 A1 | 6/2005 | Hopen et al. | |
| 2005/0198327 A1 | 9/2005 | Iwamura et al. | |
| 2005/0228850 A1* | 10/2005 | Zhu | G06F 9/5005 709/200 |
| 2005/0228852 A1* | 10/2005 | Santos | G06F 9/5005 709/200 |
| 2007/0174660 A1* | 7/2007 | Peddada | H04L 67/1027 714/4.1 |
| 2007/0253328 A1* | 11/2007 | Harper | H04L 45/00 370/219 |
| 2009/0073875 A1 | 3/2009 | Kashyap | |
| 2011/0173090 A1* | 7/2011 | Miller | G06Q 30/0641 705/26.8 |
| 2011/0185065 A1 | 7/2011 | Stanisic et al. | |
| 2011/0219121 A1 | 9/2011 | Ananthanarayanan et al. | |
| 2011/0289508 A1* | 11/2011 | Fell | H04L 67/1004 718/105 |
| 2012/0297009 A1* | 11/2012 | Amir | H04L 67/2885 709/213 |
| 2013/0007505 A1 | 1/2013 | Spear | |
| 2013/0054806 A1 | 2/2013 | Francis et al. | |
| 2013/0094357 A1* | 4/2013 | Sankar | H04L 45/586 370/230 |
| 2013/0132058 A1 | 5/2013 | Butler et al. | |
| 2013/0291107 A1 | 10/2013 | Marck et al. | |
| 2013/0297804 A1* | 11/2013 | Francis | H04L 67/1001 709/226 |
| 2014/0201314 A1 | 7/2014 | Borkenhagen | |
| 2014/0229590 A1 | 8/2014 | Bennah et al. | |
| 2014/0317441 A1 | 10/2014 | Arata | |
| 2014/0347993 A1* | 11/2014 | Hammam | H04L 67/10 370/235 |
| 2015/0121371 A1 | 4/2015 | Gummaraju et al. | |
| 2015/0189009 A1 | 7/2015 | van Bemmel | |
| 2018/0054475 A1* | 2/2018 | Agarwal | H04L 69/40 |
| 2018/0365271 A1* | 12/2018 | Castaing | G06F 16/275 |
| 2018/0367433 A1 | 12/2018 | Luna et al. | |
| 2019/0020534 A1 | 1/2019 | Volz | |
| 2019/0327129 A1 | 10/2019 | Higuchi et al. | |
| 2020/0036624 A1* | 1/2020 | Michael | H04L 43/0876 |
| 2020/0177674 A1* | 6/2020 | Liu | H04L 67/02 |
| 2020/0412602 A1* | 12/2020 | Denton | H04L 43/0817 |
| 2020/0412651 A1* | 12/2020 | Patidar | H04L 63/0471 |
| 2021/0021522 A1* | 1/2021 | Labonté | H04L 47/15 |
| 2021/0382762 A1* | 12/2021 | Edamadaka | H04L 9/3242 |
| 2022/0086237 A1* | 3/2022 | Devireddy | H04L 41/0663 |
| 2022/0121534 A1 | 4/2022 | Sontakke et al. | |
| 2022/0147457 A1* | 5/2022 | Enrici | G06F 13/1668 |
| 2022/0353325 A1 | 11/2022 | Dai et al. | |
| 2022/0353326 A1 | 11/2022 | Yang et al. | |
| 2023/0156078 A1 | 5/2023 | Yang et al. | |

* cited by examiner

LOAD BALANCING USING MULTIPLE ACTIVE SESSION ZONES

CROSS-REFERENCE TO RELATED APPLICATION(S)

This application is and a continuation of U.S. application Ser. No. 17/345,956, filed Jun. 11, 2021, which is a continuation of International Application Number PCT/CN2021/091145, filed Apr. 29, 2021, the entire disclosures of which are hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and methods for performing active-active standby for real-time telephony traffic.

One aspect of this disclosure is a system for performing active-active standby for real-time telephony traffic. The system may include a first session border controller (SBC), a second SBC, a first load balancer, a second load balancer, a third load balancer, a fourth load balancer, a cache controller, or any combination thereof. The first SBC may be associated with a datacenter. The first SBC may be configured to route real-time telephony traffic associated with a first active session zone and a second active session zone of the datacenter. The second SBC may be associated with the datacenter. The second SBC may be a standby SBC. The second SBC may be configured to route the real-time telephony traffic associated with the first active session zone and the second active session zone without interruption when a failure event is detected at the first SBC. The first load balancer, the second load balancer, or both, may be associated with the first active session zone at the datacenter. The third load balancer, the fourth load balancer, or both, may be associate with the second active session zone at the datacenter. The second load balancer and the fourth load balancer may be standby load balancers. The cache controller may be configured to failover from the first active session zone to the second active session zone when a failure event is detected at the first active session zone.

Another aspect of this disclosure is a method for performing active-active standby for real-time telephony traffic. The method includes detecting a failure event at a first active session zone. The first active session zone may be associated with a first datacenter. The method includes determining that the failure event occurred at a load balancer of the first active session zone. The method includes performing a failover of one or more sessions of the first active session zone. The failover may be to a standby load balancer if the standby load balancer is available. If the standby load balancer is not available, the failover may be to a second active session zone of the first datacenter.

Another aspect of this disclosure is a non-transitory computer-readable medium that includes instructions for performing active-active standby for real-time telephony traffic. The instructions, when executed by a processor, cause the processor to detect a failure event at a first active session zone. The first active session zone may be associated with a first datacenter. The processor may determine that the failure event occurred at a call switch of the first active session zone. The processor may perform a failover of one or more sessions of the first active session zone. The failover may be to a standby call switch if the standby call switch is available. If the standby call switch is not available, the failover may be to a second active session zone of the first datacenter.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
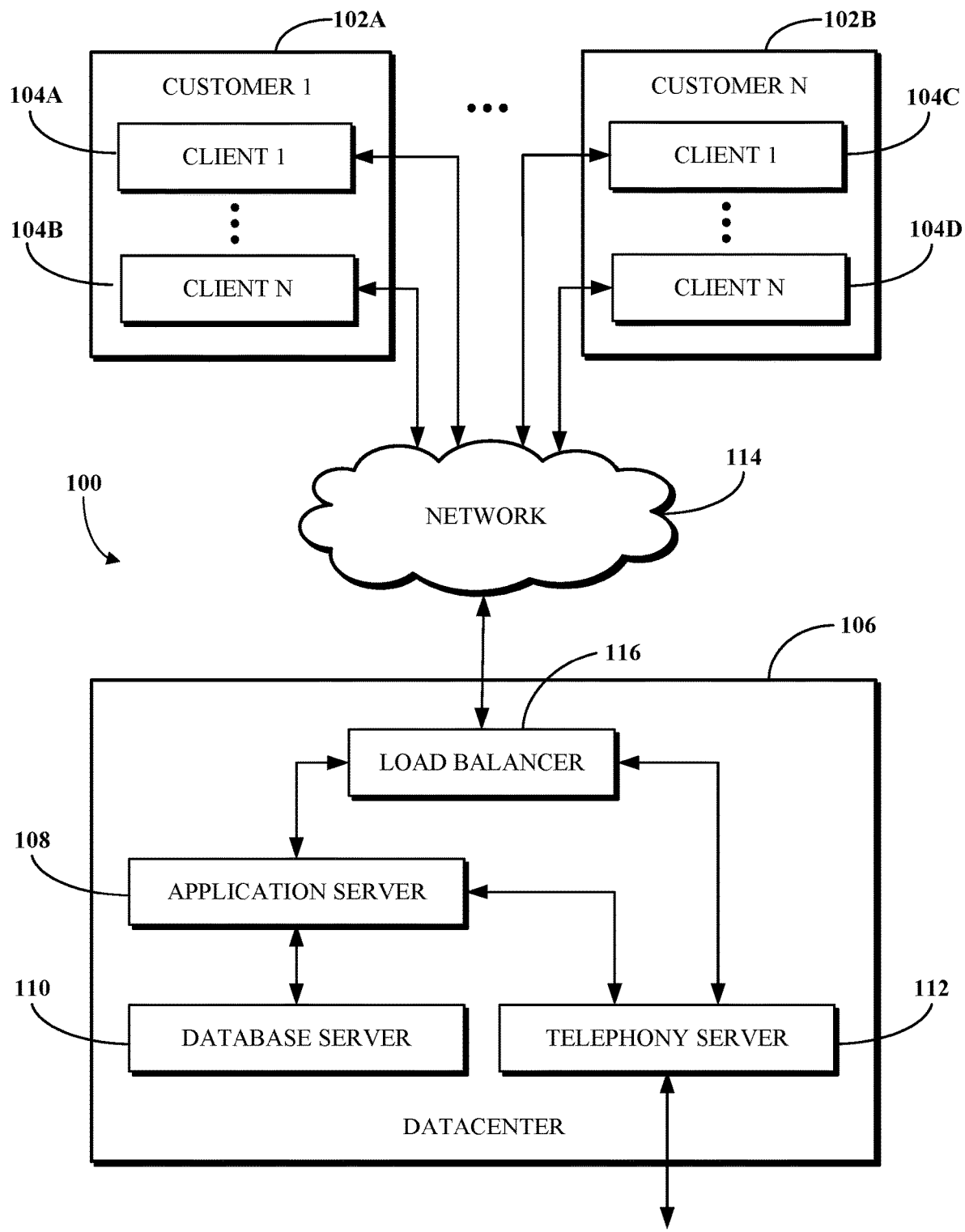
FIG. 1 is a block diagram of an example of an electronic computing and communications system.

Cloud-based services rely upon server infrastructure in datacenters. Typically, disparate computing services within a software platform, such as a UCaaS platform, share some resources such as libraries, codebase content, database records, and the like. Cloud-based services, however, may use containerization to isolate certain services while maintaining open channels between containers, as needed. Communication service sessions in a private branch exchange (PBX) of the telephony services of the software platform may be implemented using software containers for instantiating the communication service sessions. Communication service sessions may be referred to herein as sessions, where a session is, includes, or otherwise refers to an interaction by an operator of a client with a software application of the software platform. An example software container that may be used may be a Docker software container configured using Kubernetes.

A PBX may be highly scalable based on specific customer needs. However, in some cases, a customer may desire greater scalability for certain PBX services than for others. For example, a customer may desire greater scalability for messaging services over conferencing services. Problems in scalability may arise where resources of the PBX services are shared. For example, where resources of those services are shared, problems such as system instability, data loss, and/or dropped calls may occur in cross session initiation protocol (SIP) zone communications and failover where application states need to be replicated or propagated.

Implementations of this disclosure address problems such as these by maintaining active-active standby communication sessions using SIP processes between two active session zones in a first datacenter and a standby session zone in a second datacenter, for example, in the event of a failure at the first datacenter. In the event of a failure at the first active session zone at the first datacenter, a failover to the second active session zone at the first datacenter may be performed such that there are no interruptions in the active sessions. In the event of a failure at both active session zones at the first datacenter, a failover to the standby datacenter may be performed. The standby datacenter may be a remote datacenter.

Each datacenter may include a server, such as a telephony server, that has at least an active SBC and a standby SBC such that if there is a failure at the active SBC, the standby SBC can take over. Each datacenter may, for example, include multiple active zones. Each active zone may include an active load balancer and a standby load balancer such that if there is a failure at the active load balancer, the standby load balancer can take over the communications from the failed active load balancer. Each active zone may also include multiple call switches including active call switches and standby call switches such that if there is a failure in one of the call switches, a standby call switch can take over the communications from the failed active call switch. Each active zone may also include a distributed cache that is synchronized across the multiple active zones. By synchronizing the cache, calls are saved across all active zones such that call continuity is maintained if there is a failure at one of the active zones.

To describe some implementations in greater detail, reference is first made to examples of hardware and software structures used to implement a system for active-active standby for real-time telephony traffic. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based PBX system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, a SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
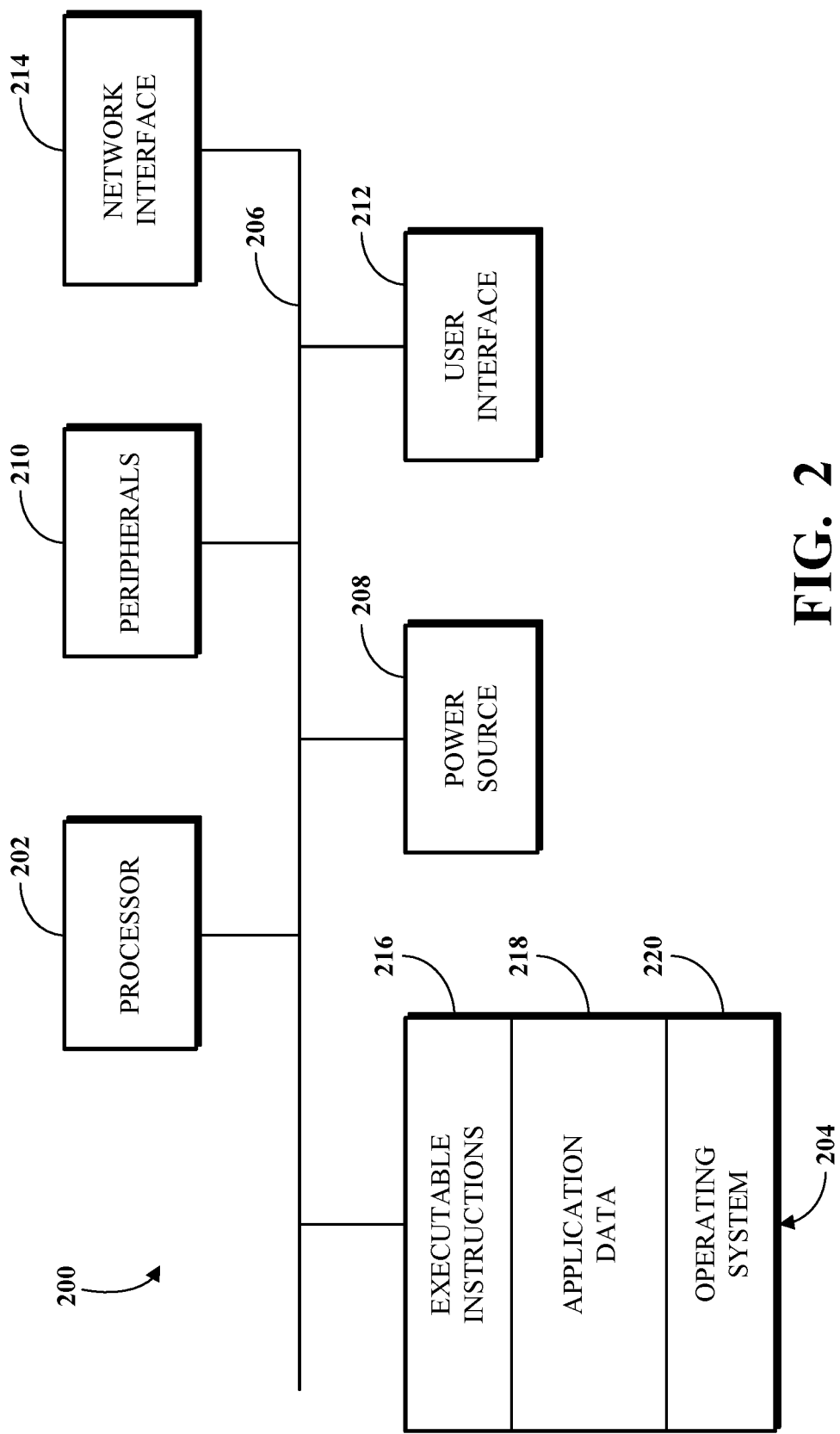
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the methods of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
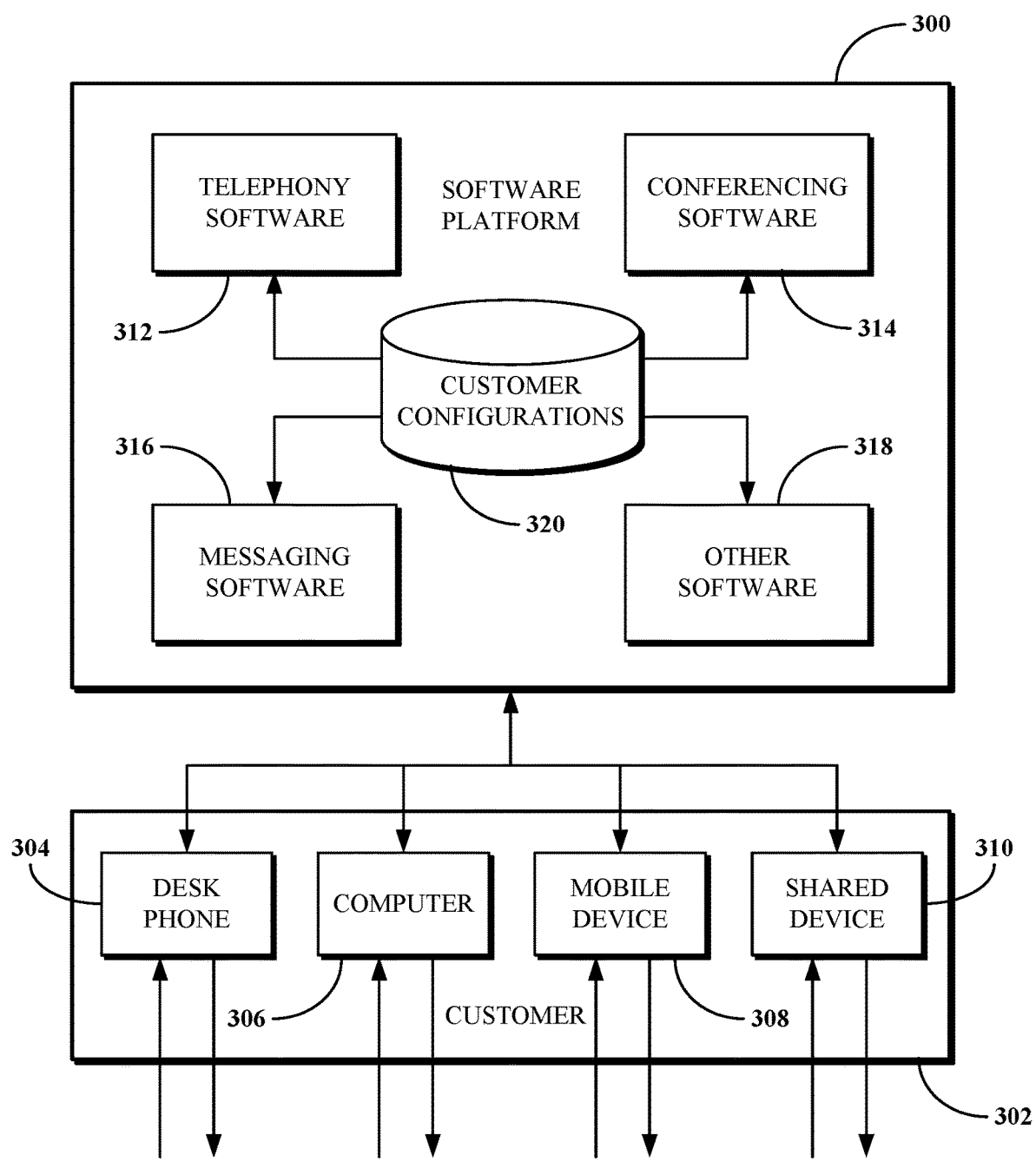
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include functionality to enable active-active standby for real-time telephony traffic.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
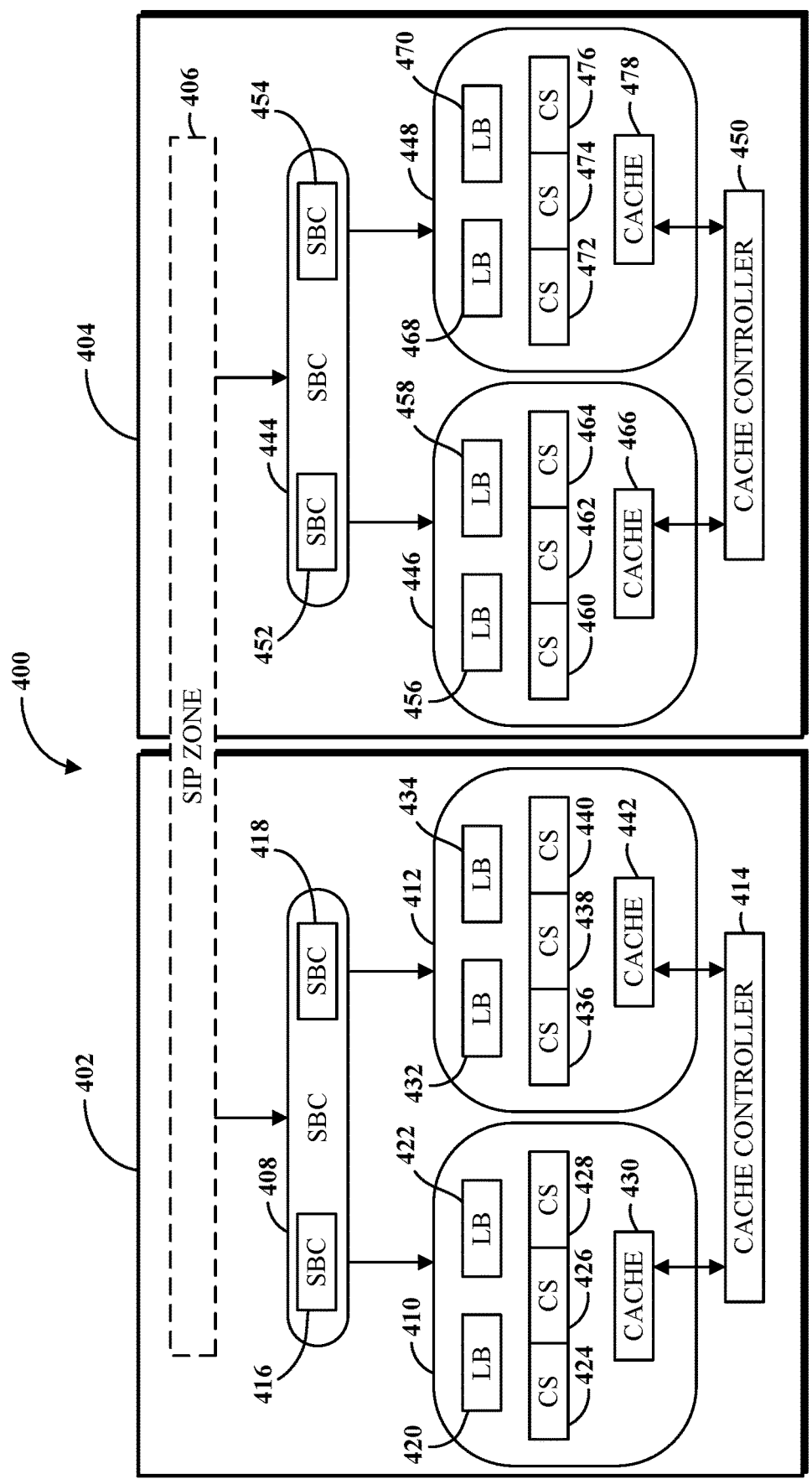
FIG. 4 is a block diagram of an example of a system for active-active standby for real-time telephony traffic.

FIG. 4 is a block diagram of an example of a system 400 for active-active standby for real-time telephony traffic. The system 400 includes a first datacenter 402 and a second datacenter 404. In this example, the first datacenter 402 is an active datacenter and the second datacenter 404 is a standby datacenter. A standby datacenter is a backup datacenter that is activated in the event of a failure at the active datacenter. The first datacenter 402 and the second datacenter 404 may communicate via a SIP zone 406. The SIP zone 406 enables a client of a customer to send and receive calls over a network, such as the network 114 shown in FIG. 1, using SIP requests and responses. The first datacenter 402 includes a SBC group 408, a first active session zone 410, a second active session zone 412, and a cache controller 414. The first datacenter 402 may include any number of active session zones, and two are only shown for simplicity and clarity.

The SBC group 408 includes a first SBC 416 and a second SBC 418. The SBC group 408 may include any number of SBCs, and two are only shown for simplicity and clarity. In this example, the first SBC 416 is an active SBC that is configured to receive and route real-time telephony traffic associated with one or more sessions to an appropriate active session zone, such as the first active session zone 410 and the second active session zone 412. The real-time telephony traffic may be routed to the appropriate active session zone based on account information, such as, for example, an account identification (ID), a customer ID, a user ID, a device ID, a customer location, a user location, or other account related information. The first SBC 416 is configured to failover to the second SBC 418 when a failure event is detected at the first SBC 416 while maintaining continuity of the sessions. The second SBC 418 is a standby SBC that functions as a backup in the event of a failure at the first SBC 416. If there is a failure at the first SBC 416, another SBC of the SBC group 408, such as the second SBC 418, will receive and route the real-time telephony traffic to the appropriate active session zone. For example, a floating IP may be used for the failover to automatically move a signaling IP address and a media IP address for the real-time telephony traffic to the second SBC 418 when there is a failure at the first SBC 416. A floating IP is an IP address that can be moved from one node to another node in the same datacenter. The first SBC 416 and second SBC 418 are shown as an example, and in some implementations, the SBC group 408 may include more than one active SBC, more than one standby SBC, or both. The first SBC 416 and second SBC 418 may share a database (not shown) so that the continuity of ongoing calls may be maintained. Failure events include, and are not limited to, detection of abnormal service, link detection failure, and detection of a system crash.

The first active session zone 410 includes a first load balancer 420 and a second load balancer 422. The first active session zone 410 may include any number of load balancers, and two are only shown for simplicity and clarity. In this example, the first load balancer 420 is an active load balancer that is configured to route, or direct, computing communications traffic, such as real-time telephony traffic including signals or messages, to respective elements of the first datacenter 402. The first load balancer 420 is configured to receive real-time telephony traffic from the first SBC 416. In an event that there is a failure at the first SBC 416, the first load balancer 420 is configured to receive the real-time telephony traffic from another SBC of the SBC group 408, such as the second SBC 418. The first load balancer 420 is configured to failover to the second load balancer 422 when a failure event is detected at the first load balancer 420 while maintaining continuity of the sessions. The second load balancer 422 is a standby load balancer that functions as a backup in the event of a failure at the first load balancer 420. If there is a failure at the first load balancer 420, another load balancer of the first active session zone 410, such as the second load balancer 422, will route, or direct, the real-time telephony traffic to respective elements of the first datacenter 402. For example, a floating IP may be used for the failover to automatically move a signaling IP address and a media IP address for the real-time telephony traffic to the second load balancer 422 when there is a failure at the first load balancer 420. The first load balancer 420 and the second load balancer 422 are shown as an example, and in some implementations, the first active session zone 410 may include more than one active load balancer, more than one standby load balancer, or both.

The first active session zone 410 includes a first call switch 424, a second call switch 426, and a third call switch 428. The first active session zone 410 may include any number of call switches, and three are only shown for simplicity and clarity. In this example, the first call switch 424 and the second call switch 426 may be active call switches that are configured to route, or direct, computing communications traffic, such as real-time telephony traffic including signals or messages, to respective clients. The first call switch 424 and the second call switch 426 are configured to receive real-time telephony traffic from the first SBC 416. In an event that there is a failure at the first SBC 416, the first call switch 424 and the second call switch 426 are configured to receive the real-time telephony traffic from another SBC of the SBC group 408, such as the second SBC 418. The first call switch 424 and the second call switch 426 are configured to failover to the third call switch 428 when a failure event is detected at the first call switch 424, the second call switch 426, or both, while maintaining continuity of the sessions. The third call switch 428 is a standby call switch that functions as a backup in the event of a failure at the first call switch 424, the second call switch 426, or both. If there is a failure at the first call switch 424, the second call switch 426, or both, another call switch of the first active session zone 410, such as the third call switch 428, will route, or direct, the real-time telephony traffic to respective endpoints, such as clients, devices, and the like which are configured to send and receive call traffic. The first call switch 424, the second call switch 426, and the third call switch 428 are shown as an example, and in some implementations, the first active session zone 410 may include more than two active call switches, more than one standby call switch, or both. In an example, the first active session zone 410 may include eight active call switches and two standby call switches. In an example, the call switches may be deployed in an N+2 configuration such that two redundant call switches are configured to take over the failover of one call switch. The call switches may share the same cache service for ongoing dialog information such that an ongoing call can be maintained when one call switch fails.

The first active session zone 410 includes a cache 430. The cache 430 may include data associated with the first active session zone 410, the second active session zone 412, or both. For example, the cache 430 may be a distributed cache that is used to save call status information from the first active session zone 410 and the second active session zone 412. Call status information may include phone number routing information, SIP dialog information, SIP registration information, account metadata, extension metadata, or any combination thereof. The cache 430 may obtain the call status information from the second active session zone 412 via the cache controller 414, as which will be described in greater detail below.

The second active session zone 412 includes a first load balancer 432 and a second load balancer 434. The second active session zone 412 may include any number of load balancers, and two are only shown for simplicity and clarity. In this example, the first load balancer 432 is an active load balancer that is configured to route, or direct, computing communications traffic, such as real-time telephony traffic associated with one or more sessions, to respective elements of the first datacenter 402. The first load balancer 432 is configured to receive real-time telephony traffic from the first SBC 416. In an event that there is a failure at the first SBC 416, the first load balancer 432 is configured to receive the real-time telephony traffic from another SBC of the SBC group 408, such as the second SBC 418. The first load balancer 432 is configured to failover to the second load balancer 434 when a failure event is detected at the first load balancer 432 while maintaining continuity of the sessions. The second load balancer 434 is a standby load balancer that functions as a backup in the event of a failure at the first load balancer 432. If there is a failure at the first load balancer 432, another load balancer of the second active session zone 412, such as the second load balancer 434, will route, or direct, the real-time telephony traffic to respective endpoints of the first datacenter 402. The first load balancer 432 and the second load balancer 434 are shown as an example, and in some implementations, the second active session zone 412 may include more than one active load balancer, more than one standby load balancer, or both.

The second active session zone 412 includes a first call switch 436, a second call switch 438, and a third call switch 440. The second active session zone 412 may include any number of call switches, and three are only shown for simplicity and clarity. In this example, the first call switch 436 and the second call switch 438 may be active call switches that are configured to route, or direct, computing communications traffic, such as real-time telephony traffic including signals or messages, to respective clients. The first call switch 436 and the second call switch 438 are configured to receive real-time telephony traffic from the first SBC 416. In an event that there is a failure at the first SBC 416, the first call switch 436 and the second call switch 438 are configured to receive the real-time telephony traffic from another SBC of the SBC group 408, such as the second SBC 418. The first call switch 436 and the second call switch 438 are configured to failover to the third call switch 440 when a failure event is detected at the first call switch 436, the second call switch 438, or both, while maintaining continuity of the sessions. The third call switch 440 is a standby call switch that functions as a backup in the event of a failure at the first call switch 436, the second call switch 438, or both. If there is a failure at the first call switch 436, the second call switch 438, or both, another call switch of the second active session zone 412, such as the third call switch 440, will route, or direct, the real-time telephony traffic to respective endpoints, such as clients, devices, and the like which are configured to send and receive call traffic. The first call switch 436, the second call switch 438, and the third call switch 440 are shown as an example, and in some implementations, the second active session zone 412 may include more than two active call switches, more than one standby call switch, or both. In an example, the second active session zone 412 may include 8 active call switches and two standby call switches.

The second active session zone 412 includes a cache 442. The cache 442 may include data associated with the second active session zone 412, the first active session zone 410, or both. For example, the cache 442 may be a distributed cache that is used to save call status information from the first active session zone 410 and the second active session zone 412. The cache 442 may obtain the call status information from the first active session zone 410 via the cache controller 414. The cache controller 414 is configured to synchronize call status information across cache 430 and cache 442 such that the call status information of the first active session zone 410 is saved in both cache 430 and cache 442, and the call status information of the second active session zone 412 is saved in both cache 442 and cache 430. The cache controller 414 is configured to double write to cache 430 and cache 442 to synchronize the call status information.

The cache controller 414 may be configured to detect a failure at the first SBC 416, the second SBC 418, the first load balancer 420, the second load balancer 422, the first call switch 424, the second call switch 426, the third call switch 428, the first load balancer 432, the second load balancer 434, the first call switch 436, the second call switch 438, the third call switch 440, or any combination thereof.

If there is a failure event at the second load balancer 422, the third call switch 428, or both, the first active session zone 410 is configured to failover to the second active session zone 412 while maintaining continuity of the sessions. The failover to the second active session zone 412 may be initiated at a call switch of the second active session zone 412, such as call switch 436, call switch 438, or call switch 440. The call switch may determine a failure event at the first active session zone 410 based on the call status information. The call switch may transmit a message, such as a SIP re-invite message to an external endpoint to re-establish the connection via an active SBC, such as SBC 416 to failover the sessions of the first active session zone 410 such that the sessions are continued without interruption on the second active session zone 412. The message may be transmitted after performing a query to obtain SIP dialog information from the cache 442 in order to maintain continuity of the ongoing call. The message may include an indication or command to route the real-time telephony traffic associated with the first active session zone to the second active session zone, and may be transmitted via the cache 442, a call switch, such as call switch 436, call switch 438, or call switch 440, a load balancer, such as load balancer 432 or load balancer 434, or any combination thereof.

The second datacenter 404 includes a SBC group 444, a first active session zone 446, a second active session zone 448, and a cache controller 450. The second datacenter 404 may include any number of active session zones, and two are only shown for simplicity and clarity. The second datacenter 404 is activated when there is a failure event at the first datacenter 402, such as a failure of all the SBCs of the SBC group 408, or a failure of the first active session zone 410 and the second active session zone 412. In an example, a failover from the first datacenter 402 to the second datacenter 404 may be performed using a disaster recovery (DR) mechanism. The DR mechanism may be based on DNS service (SRV) records, such that when the datacenter 402 fails, the external endpoints will detect the failure and attempt a second record of the DNS SRV records to connect to the second datacenter 404.

The SBC group 444 includes a first SBC 452 and a second SBC 454. The SBC group 444 may include any number of SBCs, and two are only shown for simplicity and clarity. In this example, the first SBC 452 is an active SBC that is configured to receive and route real-time telephony traffic associated with one or more sessions to an appropriate active session zone, such as the first active session zone 446 and the second active session zone 448. The real-time telephony traffic may be routed to the appropriate active session zone based on account information, such as, for example, an account ID, a customer ID, a user ID, a device ID, a customer location, a user location, or other account related information. The first SBC 452 is configured to failover to the second SBC 454 when a failure event is detected at the first SBC 452 while maintaining continuity of the sessions. The second SBC 454 is a standby SBC that functions as a backup in the event of a failure at the first SBC 452. If there is a failure at the first SBC 452, another SBC of the SBC group 444, such as the second SBC 454, will receive and route the real-time telephony traffic to the appropriate active session zone. The first SBC 452 and second SBC 454 are shown as an example, and in some implementations, the SBC group 444 may include more than one active SBC, more than one standby SBC, or both.

The first active session zone 446 includes a first load balancer 456 and a second load balancer 458. The first active session zone 446 may include any number of load balancers, and two are only shown for simplicity and clarity. In this example, the first load balancer 456 is an active load balancer that is configured to route, or direct, computing communications traffic, such as real-time telephony traffic including signals or messages, to respective elements of the second datacenter 404. The first load balancer 456 is configured to receive real-time telephony traffic from the first SBC 452. In an event that there is a failure at the first SBC 452, the first load balancer 456 is configured to receive the real-time telephony traffic from another SBC of the SBC group 444, such as the second SBC 454. The first load balancer 456 is configured to failover to the second load balancer 458 when a failure event is detected at the first load balancer 456 while maintaining continuity of the sessions. The second load balancer 458 is a standby load balancer that functions as a backup in the event of a failure at the first load balancer 456. If there is a failure at the first load balancer 456, another load balancer of the first active session zone 446, such as the second load balancer 458, will route, or direct, the real-time telephony traffic to respective endpoints of the second datacenter 404. The first load balancer 456 and the second load balancer 458 are shown as an example, and in some implementations, the first active session zone 446 may include more than one active load balancer, more than one standby load balancer, or both.

The first active session zone 446 includes a first call switch 460, a second call switch 462, and a third call switch 464. The first active session zone 446 may include any number of call switches, and three are only shown for simplicity and clarity. In this example, the first call switch 460 and the second call switch 462 may be active call switches that are configured to route, or direct, computing communications traffic, such as real-time telephony traffic including signals or messages, to respective endpoints, such as clients, devices, or the like which are configured to send and receive call traffic. The first call switch 460 and the second call switch 462 are configured to receive real-time telephony traffic from the first SBC 452. In an event that there is a failure at the first SBC 452, the first call switch 460 and the second call switch 462 are configured to receive the real-time telephony traffic from another SBC of the SBC group 444, such as the second SBC 454. The first call switch 460 and the second call switch 462 are configured to failover to the third call switch 464 when a failure event is detected at the first call switch 460, the second call switch 462, or both, while maintaining continuity of the sessions. The third call switch 464 is a standby call switch that functions as a backup in the event of a failure at the first call switch 460, the second call switch 462, or both. If there is a failure at the first call switch 460, the second call switch 462, or both, another call switch of the first active session zone 446, such as the third call switch 464, will route, or direct, the real-time telephony traffic to respective clients. The first call switch 460, the second call switch 462, and the third call switch 464 are shown as an example, and in some implementations, the first active session zone 446 may include more than two active call switches, more than one standby call switch, or both. In an example, the first active session zone 446 may include eight active call switches and two standby call switches.

The first active session zone 446 includes a cache 466. The cache 466 may be a distributed cache that is used to save call status information from the first active session zone 446 and the second active session zone 448. The cache 466 may obtain the call status information from the second active session zone 448 via the cache controller 450.

The second active session zone 448 includes a first load balancer 468 and a second load balancer 470. The second active session zone 448 may include any number of load balancers, and two are only shown for simplicity and clarity. In this example, the first load balancer 468 is an active load balancer that is configured to route, or direct, computing communications traffic, such as real-time telephony traffic associated with one or more sessions, to respective endpoints of the second datacenter 404. The first load balancer 468 is configured to receive real-time telephony traffic from the first SBC 452. In an event that there is a failure at the first SBC 452, the first load balancer 468 is configured to receive the real-time telephony traffic from another SBC of the SBC group 444, such as the second SBC 454. The first load balancer 468 is configured to failover to the second load balancer 470 when a failure event is detected at the first load balancer 468 while maintaining continuity of the sessions. The second load balancer 470 is a standby load balancer that functions as a backup in the event of a failure at the first load balancer 468. If there is a failure at the first load balancer 468, another load balancer of the second active session zone 448, such as the second load balancer 470, will route, or direct, the real-time telephony traffic to respective elements of the second datacenter 404. The first load balancer 468 and the second load balancer 470 are shown as an example, and in some implementations, the second active session zone 448 may include more than one active load balancer, more than one standby load balancer, or both.

The second active session zone 448 includes a first call switch 472, a second call switch 474, and a third call switch 476. The second active session zone 448 may include any number of call switches, and three are only shown for simplicity and clarity. In this example, the first call switch 472 and the second call switch 474 may be active call switches that are configured to route, or direct, computing communications traffic, such as real-time telephony traffic including signals or messages, to respective endpoints, such as clients, devices, or the like which are configured to send and receive call traffic. The first call switch 472 and the second call switch 474 are configured to receive real-time telephony traffic from the first SBC 452. In an event that there is a failure at the first SBC 452, the first call switch 472 and the second call switch 474 are configured to receive the real-time telephony traffic from another SBC of the SBC group 444, such as the second SBC 454. The first call switch 472 and the second call switch 474 are configured to failover to the third call switch 476 when a failure event is detected at the first call switch 472, the second call switch 474, or both, while maintaining continuity of the sessions. The third call switch 476 is a standby call switch that functions as a backup in the event of a failure at the first call switch 472, the second call switch 474, or both. If there is a failure at the first call switch 472, the second call switch 474, or both, another call switch of the second active session zone 448, such as the third call switch 476, will route, or direct, the real-time telephony traffic to respective endpoints, such as clients, devices, and the like which are configured to send and receive call traffic. The first call switch 472, the second call switch 474, and the third call switch 476 are shown as an example, and in some implementations, the second active session zone 448 may include more than two active call switches, more than one standby call switch, or both. In an example, the second active session zone 448 may include eight active call switches and two standby call switches.

The second active session zone 448 includes a cache 478. The cache 478 may be a distributed cache that is used to save call status information from the first active session zone 446 and the second active session zone 448. The cache 478 may obtain the call status information from the first active session zone 446 via the cache controller 450. The cache controller 450 is configured to synchronize call status information across cache 466 and cache 478 such that the call status information of the first active session zone 446 is saved in both cache 466 and cache 478, and the call status information of the second active session zone 448 is saved in both cache 478 and cache 466. The cache controller 450 is configured to double write to cache 466 and cache 478 to synchronize the call status information.

If there is a failure event at the second load balancer 458, the third call switch 464, or both, the first active session zone 446 is configured to failover to the second active session zone 448 while maintaining continuity of the sessions. The failover to the second active session zone 448 may be initiated at a call switch of the second active session zone 448, such as call switch 472, call switch 474, or call switch 476. The call switch may determine a failure event at the first active session zone 446 based on the call status information. The call switch may transmit a message, such as a SIP re-invite message to an external endpoint to re-establish the connection via an active SBC, such as SBC 452 to failover the sessions of the first active session zone 446 such that the sessions are continued without interruption on the second active session zone 448. The message may be transmitted after performing a query to obtain SIP dialog information from the cache 478 in order to maintain continuity of the ongoing call. The message may be transmitted via the cache 478, a call switch, such as call switch 472, call switch 474, or call switch 476, a load balancer, such as load balancer 468 or load balancer 470, or any combination thereof.

Figure 5:
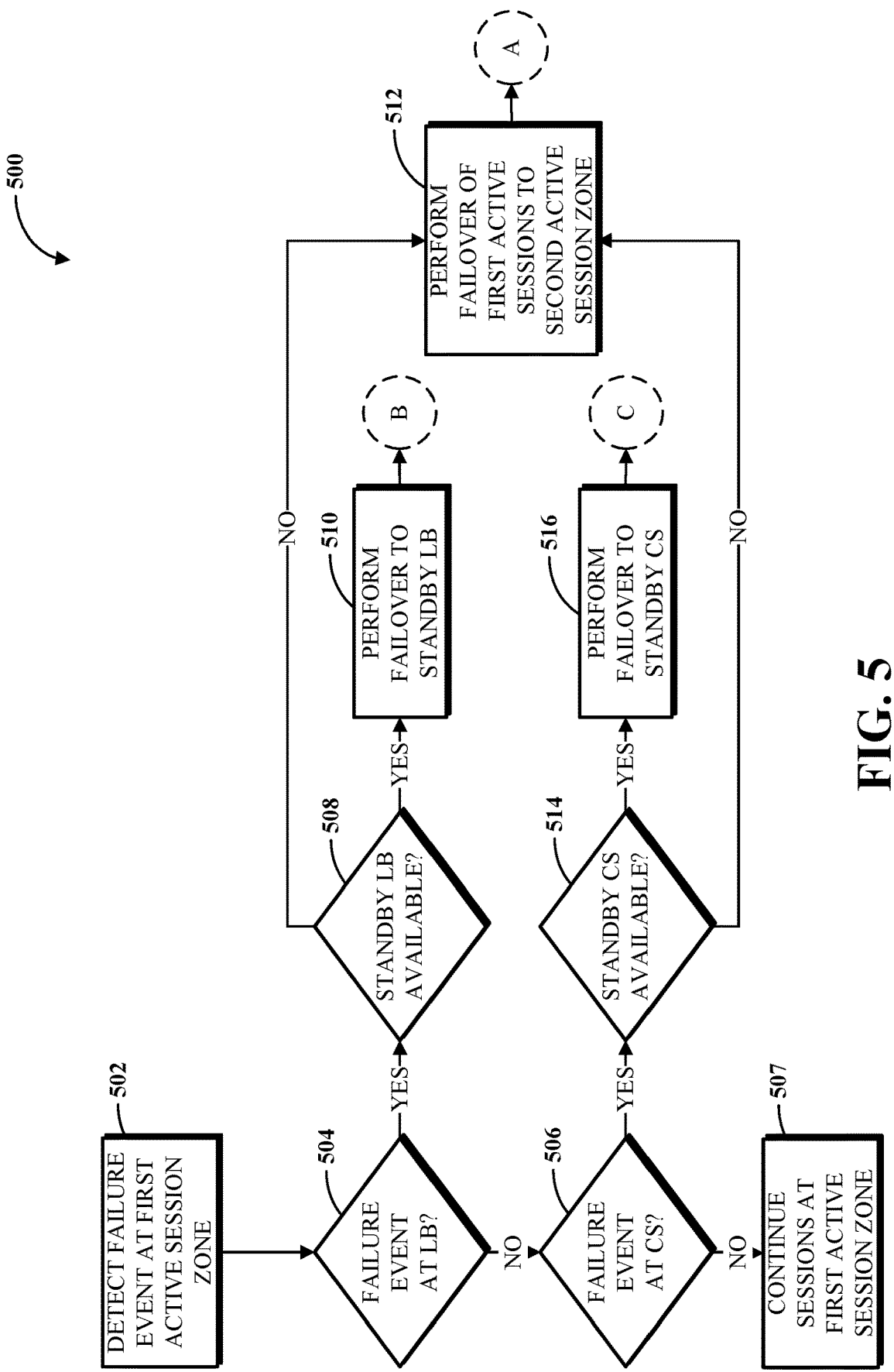
FIG. 5 is a flowchart of an example of a method for failover for an active-active standby system when a failure event is detected at a first active session zone.

FIG. 5 is a flowchart of an example of a method 500 for failover for an active-active standby system when a failure event is detected at a first active session zone. The method 500 may be performed by an active-active standby system, such as the system 400 shown in FIG. 4. The method 500 includes detecting 502 a failure event at a first active session zone, such as the first active session zone 410 shown in FIG. 4. Detecting the failure event at the first active session zone may include determining 504 whether a failure event occurred at a load balancer, such as load balancer 420 shown in FIG. 4, determining 506 whether a failure event occurred at a call switch, such as call switch 424 shown in FIG. 4, or both. If it is determined 504, 506 that a failure event did not occur at a load balancer, a call switch, or both, the method 500 includes continuing 507 the sessions at the first active session zone.

If it is determined 504 that a failure event did not occur at a load balancer, the method 500 includes determining 506 whether a failure event occurred at a call switch. If it is determined 504 that a failure event occurred at a load balancer, the method 500 includes determining 508 whether a standby load balancer, such as load balancer 422 shown in FIG. 4, is available. If it is determined that a standby load balancer is available, the method 500 includes performing 510 a failover to the standby load balancer while maintaining the continuity of the sessions. If it is determined that a standby load balancer is not available, the method 500 includes performing 512 a failover of the sessions of the first active session zone to a second active session zone, such as the second active session zone 412 shown in FIG. 4, while maintaining the continuity of the sessions. Failure events can occur at the second active session zone after the failover of the sessions from the first active session zone. The handling of failure events at the second active session zone, if they occur, will be discussed with reference to FIG. 6. Failure events can occur at the standby load balancer after the failover of the sessions from the load balancer. The handling of failure events at the standby load balancer, if they occur, will be discussed with reference to FIG. 7.

If it is determined 506 that a failure event occurred at a call switch, the method 500 includes determining 514 whether a standby call switch, such as call switch 428 shown in FIG. 4, is available. If it is determined that a standby call switch is available, the method 500 includes performing 516 a failover to the standby call switch while maintaining the continuity of the sessions. If it is determined that a standby call switch is not available, the method 500 includes performing 512 a failover of the sessions of the first active session zone to a second active session zone, such as the second active session zone 412 shown in FIG. 4, while maintaining the continuity of the sessions. Failure events can occur at the standby call switch after the failover of the sessions from the call switch. The handling of failure events at the standby call switch, if they occur, will be discussed with reference to FIG. 8.

Figure 6:
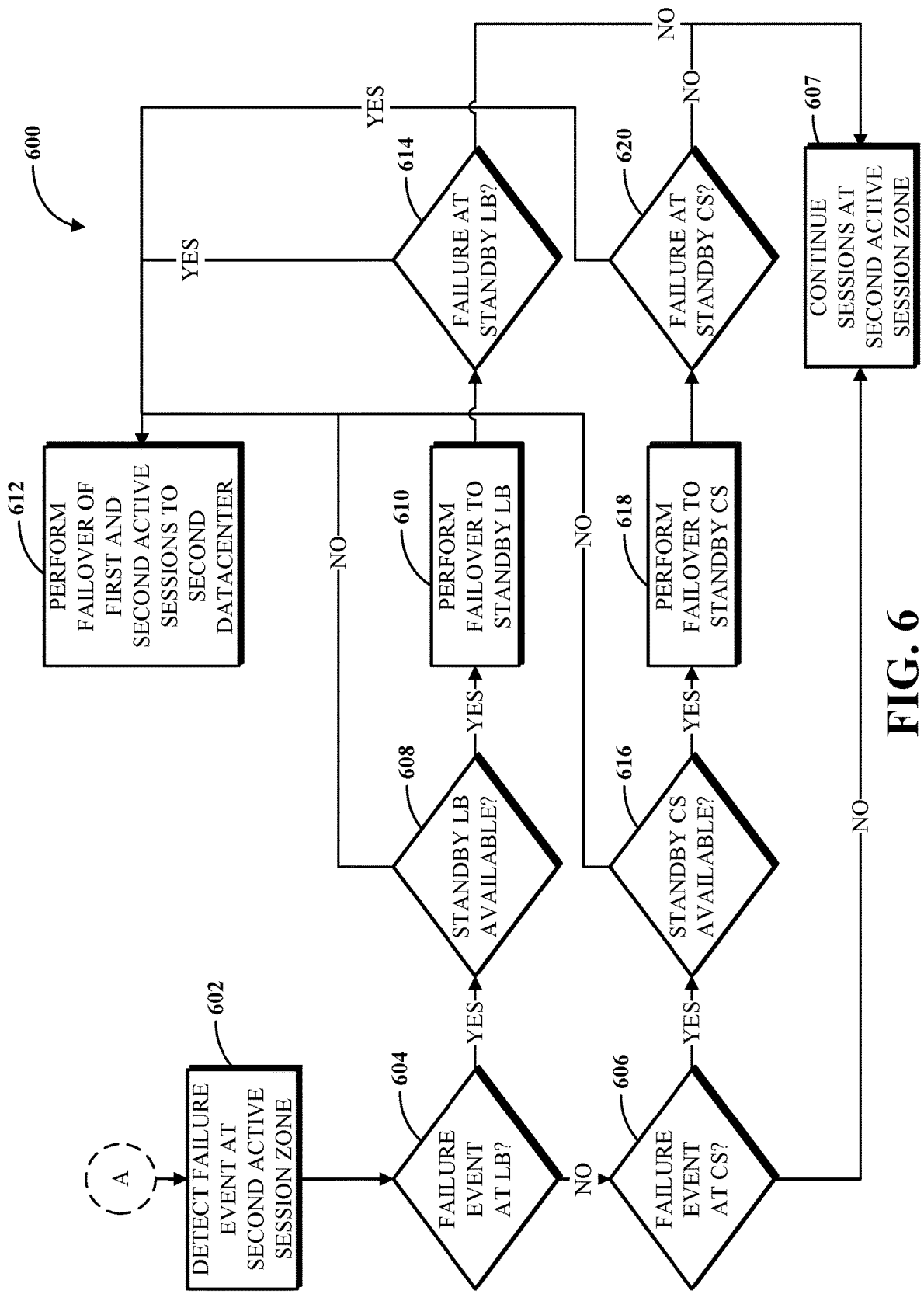
FIG. 6 is a flowchart of an example of a method for failover for an active-active standby system when a failure event is detected at a second active session zone.

FIG. 6 is a flowchart of an example of a method 600 for failover for an active-active standby system when a failure event is detected at a second active session zone, for example subsequent to performing 512 the failover of the first active sessions to the second active session zone as shown in FIG. 5. The method 600 may be performed by an active-active standby system, such as the system 400 shown in FIG. 4. The method 600 includes detecting 602 a failure event at a second active session zone, such as the second active session zone 412 shown in FIG. 4. Detecting the failure event at the second active session zone may include determining 604 whether a failure event occurred at a load balancer, such as load balancer 420 shown in FIG. 4, determining 606 whether a failure event occurred at a call switch, such as call switch 424 shown in FIG. 4, or both. If it is determined 604, 606 that a failure event did not occur at a load balancer, a call switch, or both, the method 600 includes continuing 607 the sessions at the second active session zone.

If it is determined 604 that a failure event occurred at a load balancer, the method 600 includes determining 608 whether a standby load balancer, such as load balancer 422 shown in FIG. 4, is available. If it is determined that a standby load balancer is available, the method 600 includes performing 610 a failover of the sessions of the first active zone and the second active zone to the standby load balancer while maintaining the continuity of the sessions. If it is determined that a standby load balancer is not available, the method 600 includes performing 612 a failover of the sessions of the first active session zone and the second active session zone to a second datacenter, such as the second datacenter 404 shown in FIG. 4. If it is determined 614 that a failure event occurred at the standby load balancer after the failover of the sessions of the first active zone and the second active zone to the standby load balancer, the method 600 includes performing 612 a failover of the session of the first active session zone and the second active session zone to a second datacenter, such as the second datacenter 404 shown in FIG. 4. If it is determined 614 that a failure event did not occur at the standby load balancer, the method 600 includes continuing 607 the sessions at the second active session zone.

If it is determined 604 that a failure event did not occur at a load balancer, the method includes determining 606 whether a failure event occurred at a call switch. If it is determined 606 that a failure event occurred at a call switch, the method 600 includes determining 616 whether a standby call switch, such as call switch 428 shown in FIG. 4, is available. If it is determined that a standby call switch is available, the method 600 includes performing 618 a failover of the sessions of the first active session zone and the second active session zone to the standby call switch while maintaining the continuity of the sessions. If it is determined that a standby call switch is not available, the method 600 includes performing 612 a failover of the sessions of the first active session zone and the second active session zone to a second datacenter, such as the second datacenter 404 shown in FIG. 4. If it is determined 620 that a failure event occurred at the standby call switch after the failover of the sessions of the first active zone and the second active zone to the standby call switch, the method 600 includes performing 612 a failover of the sessions of the first active session zone and the second active session zone to a second datacenter, such as the second datacenter 404 shown in FIG. 4, such that the sessions of the first datacenter, including the sessions of the first active session zone and the second active session zone, are continued at the second datacenter. If it is determined 620 that a failure event did not occur at the standby call switch, the method 600 includes continuing 607 the sessions at the second active session zone.

Figure 7:
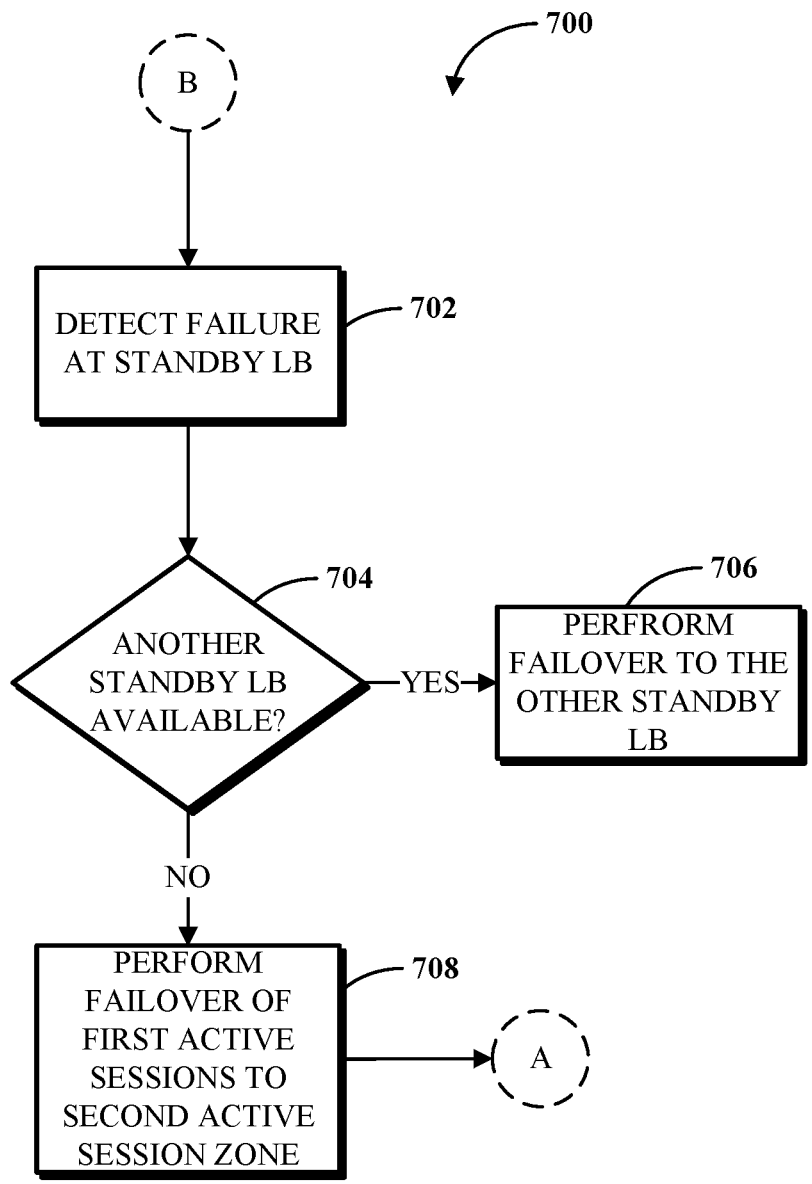
FIG. 7 is a flowchart of an example of a method for failover for an active-active standby system when a failure event is detected at a standby load balancer.

FIG. 7 is a flowchart of an example of a method 700 for failover for an active-active standby system when a failure event is detected at a standby load balancer, for example subsequent to performing 510 the failover of the first active sessions to the standby load balancer as shown in FIG. 5. The method 700 may be performed by an active-active standby system, such as the system 400 shown in FIG. 4. In this example, the standby load balancer may be the second load balancer 422 shown in FIG. 4.

The method 700 includes detecting 702 a failure event at the standby load balancer. In response to determining 702 that a failure event occurred at the standby load balancer, the method 700 includes determining 704 whether another standby load balancer is available. If it is determined that another standby load balancer is available, the method 700 includes performing 706 a failover of the sessions of the first active zone to the other standby load balancer while maintaining the continuity of the sessions. If it is determined that another standby load balancer is not available, the method 700 includes performing 708 a failover of the sessions of the first active session zone to a second active session zone, such as the second active session zone 412 shown in FIG. 4, while maintaining continuity of the sessions. Failure events can occur at the second active session zone after the failover of the sessions from the first active session zone. The handling of failure events at the second active session zone, if they occur, are discussed with reference to FIG. 6.

Figure 8:
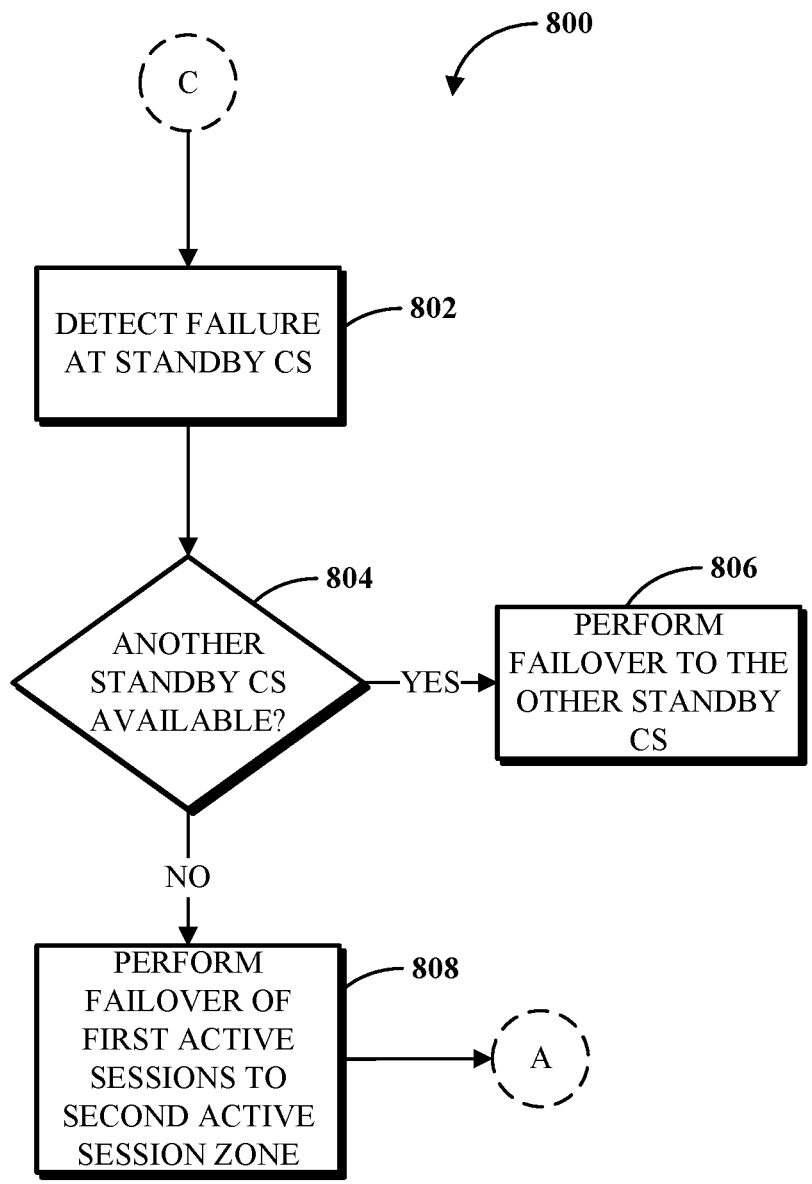
FIG. 8 is a flowchart of an example of a method for failover for an active-active standby system when a failure event is detected at a standby call switch.

FIG. 8 is a flowchart of an example of a method 800 for failover for an active-active standby system when a failure event is detected at a standby call switch, for example subsequent to performing 516 the failover of the first active sessions to the standby call switch as shown in FIG. 5. The method 800 may be performed by an active-active standby system, such as the system 400 shown in FIG. 4. In this example, the standby call switch may be the third call switch 428 shown in FIG. 4.

The method 800 includes detecting 802 a failure event at the standby call switch. In response to determining 802 that a failure event occurred at the standby call switch, the method 800 includes determining 804 whether another standby call switch is available. If it is determined that another standby call switch is available, the method 800 includes performing 806 a failover of the sessions of the first active zone to the other standby call switch while maintaining the continuity of the sessions. If it is determined that another standby call switch is not available, the method 800 includes performing 808 a failover of the sessions of the first active session zone to a second active session zone, such as the second active session zone 412 shown in FIG. 4, while maintaining continuity of the sessions. Failure events can occur at the second active session zone after the failover of the sessions from the first active session zone. The handling of failure events at the second active session zone, if they occur, are discussed with reference to FIG. 6.

Figure 9:
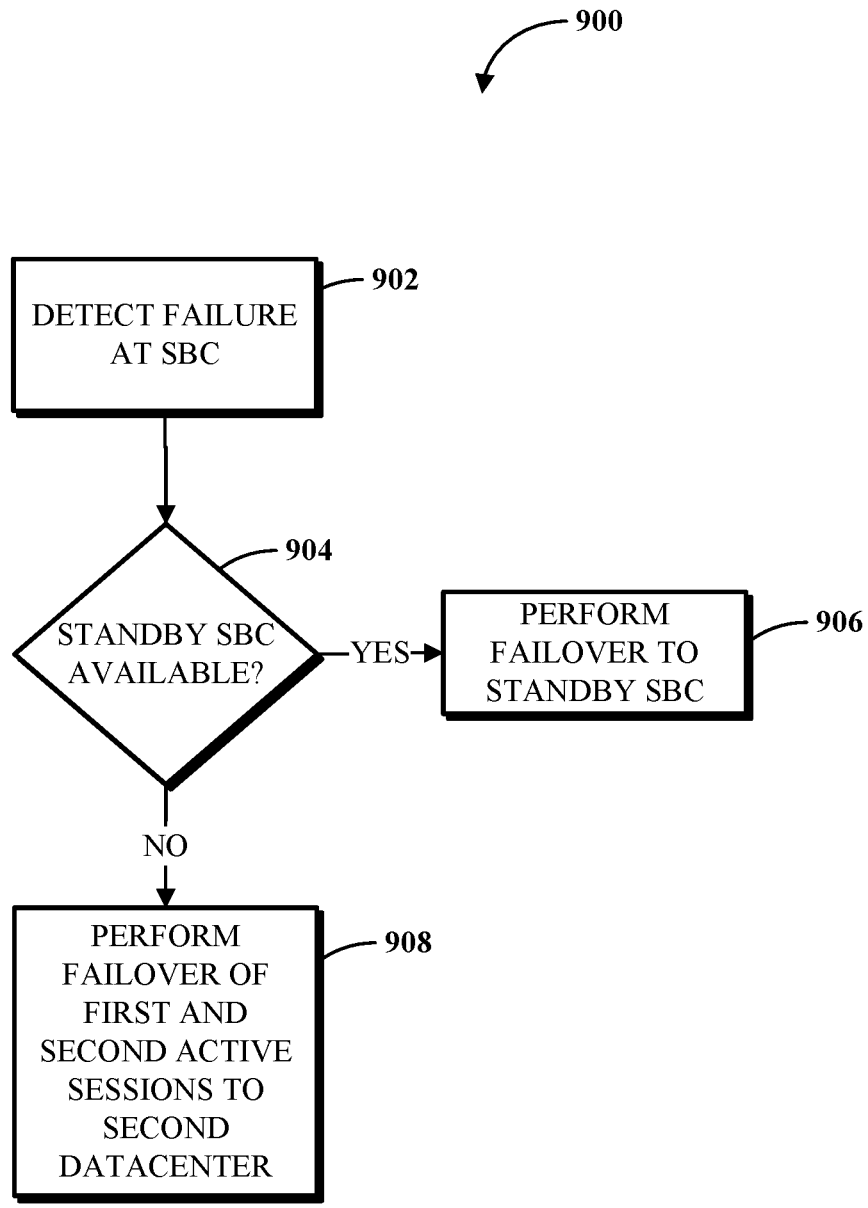
FIG. 9 is a flowchart of an example of a method for failover for an active-active standby system when a failure event is detected at a SBC.

FIG. 9 is a flowchart of an example of a method 900 for failover for an active-active standby system when a failure event is detected at a SBC, such as when there is a failure at an SBC group, such as SBC group 408 shown in FIG. 4. The method 900 may be performed by an active-active standby system, such as the system 400 shown in FIG. 4. In this example, the SBC may be the first SBC 416 shown in FIG. 4.

The method 900 includes detecting 902 a failure event at the SBC. In response to determining 902 that a failure event occurred at the SBC, the method 900 includes determining 904 whether a standby SBC, such as the second SBC 418 shown in FIG. 4, is available. If it is determined that a standby SBC is available, the method 900 includes performing 906 a failover of the sessions of the first active zone and the second active zone to the standby SBC while maintaining the continuity of the sessions. If it is determined that a standby SBC is not available, the method 900 includes performing 908 a failover of the sessions of the first active session zone and the second active session zone to a second datacenter, such as the second datacenter 404 shown in FIG. 4.

The methods described in FIGS. 5-9 can be executed using computing devices, such as the systems, hardware, and software described with respect to FIGS. 1-4. The methods can be performed, for example, by executing a machine-readable program or other computer-executable instructions, such as routines, instructions, programs, or other code. The steps, or operations, of the methods or other techniques, methods, processes, or algorithms described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

An aspect may include a system that comprises a first load balancer, a second load balancer, a third load balancer, a fourth load balancer, and a cache controller. The first an second load balancers may be associated with a first active session zone at a datacenter. The third and fourth load balancers may be associated with a second active session zone at the datacenter. The second load balancer and the fourth load balancer may be standby load balancers. The cache controller may be configured to failover from the first active session zone to the second active session zone during a failure event at the first active session zone.

An aspect may include a method that comprises detecting a failure event at a first active session zone of a first data center. The method may include performing a failover from the first active session zone to a second active session zone when a standby load balancer is not available.

An aspect may include a non-transitory computer-readable medium comprising instructions that when executed by a processor, cause the processor to detect a failure event at a first active session zone of a first data center. The processor may be configured to perform a failover from the first active session zone to a second active session zone when a standby load balancer is not available.

In one or more aspects, the cache controller may be configured to transmit a message to route real-time telephony traffic associated with the first active session zone to the second active session zone during the failure event at the first active session zone. In one or more aspects, the cache controller may be configured to transmit a message via the third load balancer or the fourth load balancer to route the real-time telephony traffic associated with the first active session zone to the second active session zone during the failure event at the first active session zone. In one or more aspects, the first load balancer may be configured to failover to the second load balancer during a failure event at the first load balancer. In one or more aspects, the third load balancer may be configured to failover to the fourth load balancer during a failure event at the third load balancer. In one or more aspects, the system may include a first cache that comprises first data associated with the first active session zone. The system may include a second cache that comprises second data associated with the second active session zone, and the cache controller may be configured to synchronize the first cache and the second cache such that the second data is saved to the first cache and the first data is saved to the second cache. In one or more aspects, the cache controller may be configured to detect a failure at the first load balancer. In one or more aspects, the cache controller may be configured to detect a failure at the second load balancer.

In one or more aspects, a failure event may be detected at the second active session zone. In one or more aspects, a second failover to a second data center may be performed. In one or more aspects, a second failure event may be detected at the standby load balancer. In one or more aspects, a second failover to a second standby load balancer may be performed. In one or more aspects, a third failure event may be detected at the second standby load balancer. In one or more aspects, a third failover to a second data center may be performed. In one or more aspects, the first active session zone may include one or more sessions. In one or more aspects, the second active session zone may include one or more sessions.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and methods can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and methods disclosed herein could employ a number of conventional methods for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
   a first and second load balancer circuit, wherein the first and second load balancer circuits are associated with a first active session zone at a datacenter, and wherein the first active session zone comprises two active call switches and one standby call switch;
   a third and fourth load balancer circuit, wherein the third and fourth load balancer circuits are associated with a second active session zone at the datacenter, wherein the second load balancer circuit and the fourth load balancer circuit are standby load balancers; and
   a cache controller circuit configured to:
      synchronize session state data between a first cache comprising first session state data associated with the first active session zone and a second cache comprising second session state data associated with the second active session zone; and
      failover from the first active session zone to the second active session zone during a failure event at the first active session zone such that ongoing sessions are continued at the second active session zone without interruption.

2. The system of claim 1, wherein the cache controller circuit is configured to transmit a message to route real-time telephony traffic associated with the first active session zone to the second active session zone during the failure event at the first active session zone.

3. The system of claim 1, wherein the cache controller circuit is configured to transmit a message via the third load balancer circuit or the fourth load balancer circuit to route real-time telephony traffic associated with the first active session zone to the second active session zone during the failure event at the first active session zone.

4. The system of claim 1, wherein the first load balancer circuit is configured to failover to the second load balancer circuit during a failure event at the first load balancer circuit.

5. The system of claim 1, wherein the third load balancer circuit is configured to failover to the fourth load balancer circuit during a failure event at the third load balancer circuit.

6. The system of claim 1, further comprising:
   a first cache comprising first data associated with the first active session zone; and
   a second cache comprising second data associated with the second active session zone,
   wherein the cache controller circuit is configured to synchronize the first cache and the second cache such that the second data is saved to the first cache and the first data is saved to the second cache.

7. The system of claim 1, wherein the cache controller circuit is configured to detect a failure at the first load balancer circuit.

8. The system of claim 1, wherein the cache controller circuit is configured to detect a failure at the second load balancer circuit.

9. A method comprising:
   synchronizing session state data between a first cache comprising first session state data associated with a first active session zone of a first datacenter and a second cache comprising second session state data associated with a second active session zone of the first datacenter;
   detecting a failure event at the first active session zone, wherein the first active session zone includes a first and second load balancer circuit, and wherein the first active session zone comprises two active call switches and one standby call switch; and
   performing, via a cache controller circuit, a failover from the first active session zone to the second active session zone when a standby load balancer is not available such that ongoing sessions are continued at the second active session zone without interruption.

10. The method of claim 9, further comprising:
    detecting a failure event at the second active session zone; and
    performing a second failover to a second data center.

11. The method of claim 9, further comprising:
    detecting a second failure event at the standby load balancer; and
    performing a second failover to a second standby load balancer.

12. The method of claim 9, further comprising:
    detecting a second failure event at the standby load balancer;
    performing a second failover to a second standby load balancer;
    detecting a third failure event at the second standby load balancer; and
    performing a third failover to a second data center.

13. The method of claim 9, wherein the first active session zone includes one or more sessions.

14. The method of claim 9, wherein the second active session zone includes one or more sessions.

15. A non-transitory computer-readable medium comprising instructions that when executed by a processor cause the processor to:
    synchronize session state data between a first cache comprising first session state data associated with a first active session zone of a first datacenter and a second cache comprising second session state data associated with a second active session zone of the first datacenter;

determine a failure event at the first active session zone, wherein the first active session zone includes a first and second load balancer circuit, and wherein the first active session zone comprises two active call switches and one standby call switch; and perform, via a cache controller circuit, a failover from the first active session zone to the second active session zone when a standby load balancer is not available such that ongoing sessions are continued at the second active session zone without interruption.

16. The non-transitory computer-readable medium of claim 15, wherein the processor comprises circuitry configured to:

determine a failure event at the second active session zone; and perform a second failover to a second data center based on the failure event.

17. The non-transitory computer-readable medium of claim 15, wherein the processor comprises circuitry configured to:

determine a second failure event at the standby load balancer; and perform a second failover to a second standby load balancer based on the second failure event.

18. The non-transitory computer-readable medium of claim 15, wherein the processor comprises circuitry configured to:

determine a second failure event at the standby load balancer;

perform a second failover to a second standby load balancer;

detect a third failure event at the second standby load balancer; and perform a third failover to a second data center based on the detected third failure event.

19. The non-transitory computer-readable medium of claim 15, wherein the first active session zone includes at least one session.

20. The non-transitory computer-readable medium of claim 15, wherein the second active session zone includes at least one session.

* * * * *